(12) United States Patent
Tsuda et al.

(10) Patent No.: US 10,807,235 B2
(45) Date of Patent: Oct. 20, 2020

(54) MACHINE LEARNING DEVICE, ROBOT CONTROLLER, ROBOT SYSTEM, AND MACHINE LEARNING METHOD FOR LEARNING ACTION PATTERN OF HUMAN

(71) Applicants: FANUC CORPORATION, Yamanashi (JP); Preferred Networks, Inc., Tokyo (JP)

(72) Inventors: Taketsugu Tsuda, Yamanashi (JP); Daisuke Okanohara, Tokyo (JP); Ryosuke Okuta, Tokyo (JP); Eiichi Matsumoto, Tokyo (JP); Keigo Kawaai, Tokyo (JP)

(73) Assignees: FANUC CORPORATION, Yamanashi (JP); PREFERRED NETWORKS, INC., Tokyo (JP)

( * ) Notice: Subject to any disclaimer, the term of this patent is extended or adjusted under 35 U.S.C. 154(b) by 0 days.

(21) Appl. No.: 16/371,809

(22) Filed: Apr. 1, 2019

(65) Prior Publication Data
US 2019/0224844 A1 Jul. 25, 2019

Related U.S. Application Data

(63) Continuation of application No. 15/222,947, filed on Jul. 29, 2016, now abandoned.

(30) Foreign Application Priority Data

Jul. 31, 2015 (JP) .................................. 2015-151561
Jan. 29, 2016 (JP) .................................. 2016-015538

(51) Int. Cl.
*B25J 9/00* (2006.01)
*B25J 9/16* (2006.01)
(Continued)

(52) U.S. Cl.
CPC ............. *B25J 9/163* (2013.01); *B25J 9/0084* (2013.01); *B25J 9/1653* (2013.01); *B25J 9/1676* (2013.01);
(Continued)

(58) Field of Classification Search
CPC ........ B25J 9/163; B25J 9/0084; B25J 9/1653; B25J 9/1676; B25J 9/1694; B25J 13/084;
(Continued)

(56) References Cited

U.S. PATENT DOCUMENTS 3,940,110 A * 2/1976 Motoda ................. B66C 23/005
254/270
5,172,253 A * 12/1992 Lynne ...................... G06N 3/08
706/19
(Continued)

FOREIGN PATENT DOCUMENTS

CN       1380846 A      11/2002
CN     101051215 A      10/2007
(Continued)

OTHER PUBLICATIONS

Kroemer; "Combining active learning and reactive control for robot grasping"; Robotics and Autonomous Systems; vol. 58; pp. 1105-1116; 2010 (Year: 2010).*
(Continued)

*Primary Examiner* — Stephen Holwerda
(74) *Attorney, Agent, or Firm* — Hauptman Ham, LLP

(57) ABSTRACT

A machine learning device for a robot that allows a human and the robot to work cooperatively, the machine learning device including a state observation unit that observes a state variable representing a state of the robot during a period in that the human and the robot work cooperatively; a determination data obtaining unit that obtains determination data for at least one of a level of burden on the human and a (Continued)

working efficiency; and a learning unit that learns a training data set for setting an action of the robot, based on the state variable and the determination data.

23 Claims, 7 Drawing Sheets

(51) Int. Cl.
  *B25J 13/08* (2006.01)
  *B25J 19/06* (2006.01)
  *G06N 3/08* (2006.01)
(52) U.S. Cl.
  CPC ........... *B25J 9/1694* (2013.01); *B25J 13/084* (2013.01); *B25J 13/085* (2013.01); *B25J 13/088* (2013.01); *B25J 19/06* (2013.01); *G06N 3/08* (2013.01); *G05B 2219/40202* (2013.01)
(58) Field of Classification Search
  CPC ........ B25J 13/085; B25J 13/088; B25J 19/06; G06N 3/08; G05B 2219/40202
  See application file for complete search history.

(56) References Cited

U.S. PATENT DOCUMENTS

| | | | | |
|---|---|---|---|---|
| 5,865,426 | A * | 2/1999 | Kazerooni | B66C 1/62 212/285 |
| 6,204,619 | B1 * | 3/2001 | Gu | B66C 23/005 254/1 |
| 6,216,056 | B1 * | 4/2001 | Ito | B25J 9/16 700/157 |
| 6,272,396 | B1 * | 8/2001 | Taitler | G05B 19/423 318/568.13 |
| 6,353,814 | B1 * | 3/2002 | Weng | G05B 13/0265 700/258 |
| 6,394,731 | B1 | 5/2002 | Konosu et al. | |
| 6,430,473 | B1 * | 8/2002 | Lee | B25J 9/162 318/568.16 |
| 6,522,952 | B1 * | 2/2003 | Arai | B25J 9/1679 414/591 |
| 7,478,073 | B2 | 1/2009 | Kaplan et al. | |
| 2002/0158599 | A1 | 10/2002 | Fujita et al. | |
| 2005/0021483 | A1 | 1/2005 | Kaplan et al. | |
| 2005/0071048 | A1 | 3/2005 | Watanabe et al. | |
| 2007/0239644 | A1 | 10/2007 | Minamino et al. | |
| 2007/0274812 | A1 | 11/2007 | Ban et al. | |
| 2007/0282485 | A1 | 12/2007 | Nagatsuka et al. | |
| 2009/0105881 | A1 | 4/2009 | Wang et al. | |
| 2010/0087955 | A1 | 4/2010 | Tsusaka et al. | |
| 2010/0092032 | A1 | 4/2010 | Boca | |
| 2010/0114807 | A1 | 5/2010 | Ueda et al. | |
| 2010/0262286 | A1 | 10/2010 | Eidenberger et al. | |
| 2011/0015785 | A1 * | 1/2011 | Tsusaka | B25J 9/0003 700/254 |
| 2012/0253514 | A1 | 10/2012 | Sugimoto et al. | |
| 2013/0345873 | A1 | 12/2013 | Blumberg et al. | |
| 2014/0031985 | A1 | 1/2014 | Kumiya | |
| 2014/0067127 | A1 | 3/2014 | Gotou | |
| 2014/0114888 | A1 | 4/2014 | Noda et al. | |
| 2015/0100530 | A1 * | 4/2015 | Mnih | G06N 20/00 706/25 |
| 2015/0127154 | A1 * | 5/2015 | Passot | B25J 9/161 700/257 |
| 2015/0174771 | A1 | 6/2015 | Fujita | |
| 2016/0209817 | A1 | 7/2016 | Kameda et al. | |

FOREIGN PATENT DOCUMENTS

| | | |
|---|---|---|
| CN | 103753557 A | 4/2014 |
| EP | 0997426 B1 | 2/2009 |
| JP | 2000-94374 A | 4/2000 |
| JP | 2005-50310 A | 2/2005 |
| JP | 2005-103681 A | 4/2005 |
| JP | 2005-118959 A | 5/2005 |
| JP | 2005-199383 A | 7/2005 |
| JP | 2006-289602 A | 10/2006 |
| JP | 2006-320997 A | 11/2006 |
| JP | 2007-313624 A | 12/2007 |
| JP | 2009-262279 A | 11/2009 |
| JP | 2010134907 A | 6/2010 |
| JP | 2010-244549 A | 10/2010 |
| JP | 2011-248728 A | 12/2011 |
| JP | 2012208789 A | 10/2012 |
| JP | 2013-52490 A | 3/2013 |
| JP | 2013-180369 A | 9/2013 |
| JP | 2014-81863 A | 5/2014 |
| JP | 2014-206795 A | 10/2014 |
| JP | 5642738 B2 | 12/2014 |
| JP | 5670397 B2 | 2/2015 |
| JP | 2015-123505 A | 7/2015 |
| WO | 2015/037165 A1 | 3/2015 |

OTHER PUBLICATIONS

Office Action in U.S. Appl. No. 15/223,141, dated Aug. 2, 2019, 26pp.
Mnih et al., "Human-level control through deep reinforcement learning," Nature, Feb. 26, 2015, pp. 529-533 (13 pages), vol. 518, Macmillan Publishers Limited.
Shibata et al., "Learning of Action Generation from Raw Camera Images in a Real-World-like Environment by Simple Coupling of Reinforcement Learning and a Neural Network," Advances in Neuro-Information Processing (Proc. of ICONIP'08), 2009, pp. 754-761, vol. 5506, Lecture Notes in Computer Science, Oita, Japan.
Shibata et al., "Direct-Vision-Based Reinforcement Learning Using a Layered Neural Network—for the Whole Process from Sensors to Motors-," Transactions of the Society of Instrument and Control Engineers, Feb. 2001, pp. 168-177, vol. 37, No. 2.
Non-Final Office Action issued in U.S. Appl. No. 15/223,141, dated Jan. 9, 2018, 30 pages.
Final Office Action issued in U.S. Appl. No. 15/223,141, dated Aug. 7, 2018, 27 pages.
Wunsch; "Real-time pose estimation of 3-D objects from camera images using neural networks"; Proceedings of the 1997 IEEE International Conference on Robotics and Automation; vol. 4; pp. 3232-3237; 1997 (Year: 1997).
Non-Final Office Action issued in U.S. Appl. No. 15/223,141, dated Mar. 1, 2019, 38 pages.
Noboru Sugino, "Grasping Control of a Robot Hand by Reinforcement Learning", vol. 121-C No. 4, Apr. 1, 2001, pp. 710-717, The Institute of Electrical Engineers of Japan (IEEJ), Tokyo, Japan.
Non-Final Office Action issued in U.S. Appl. No. 15/222,947, dated Jan. 10, 2018, 26 pages.
Final Office Action issued in U.S. Appl. No. 15/222,947, dated May 24, 2018, 18 pages.
Office Action in U.S. Appl. No. 15/222,947, dated Dec. 31, 2018, 18 pages.
Lin et al., "Dual Reinforcement Learning Based on Bias Learning", Journal of Computer Research and Development, 2008, 45(9): 1455-1462, Sep. 15, 2008, 8pp.

* cited by examiner

MACHINE LEARNING DEVICE, ROBOT CONTROLLER, ROBOT SYSTEM, AND MACHINE LEARNING METHOD FOR LEARNING ACTION PATTERN OF HUMAN

RELATED APPLICATIONS

The present application is a Continuation of U.S. application Ser. No. 15/222,947, filed Jul. 29, 2016, which claims priority to Japanese Patent Application Numbers 2015-151561 filed Jul. 31, 2015 and 2016-015538 filed Jan. 29, 2016, the disclosures of each application are hereby incorporated by reference herein in their entireties.

BACKGROUND OF THE INVENTION

1. Field of the Invention

The present invention relates to a machine learning device, a robot controller, a robot system, and a machine learning method for learning the action pattern of a human.

2. Description of the Related Art

In conventional techniques, to ensure human safety, safety measures are taken to forbid humans from entering the working area of a robot when the robot is driven. For example, a robot is enclosed with a safety fence to forbid humans to step over the safety fence during the period in which the robot is driven. In recent years, a robot system which allows a human to work cooperatively with a robot is known. The robot system allows the robot and the human to simultaneously perform one task without enclosing the robot with a safety fence.

Japanese Laid-open Patent Publication No. 2015-123505 discloses an industrial robot which works cooperatively with a human. The robot includes a movable unit, a protective member, and a detector. The movable unit is supported by the basal portion. The protective member is made of a material having rigidity lower than that of the movable unit and covers the periphery of the movable unit. The detector is located in the movable unit and detects an external force input via the protective member.

A general industrial robot is driven in accordance with an operation program created in advance. Alternatively, the robot is driven to pass through a teaching point taught by, e.g., a teaching pendant in advance. In other words, the robot is driven along a predetermined trajectory.

Even in a robot system which allows a human to work cooperatively with a robot, the trajectory of the robot can be set in advance to drive the robot along the generated trajectory. However, when a human works cooperatively with the robot, more than one working method may be selectable. In, e.g., plants for manufacturing products, workpieces may be transported from the initial to target positions. To transport workpieces, the workpieces may be lifted by cooperation between the human and the robot and transported to the target positions. The robot can lift and transport objects to be transported. In this case, numerous options are available for, e.g., the orientation and velocity at which the workpieces are lifted.

The level of burden on a human varies for each method for controlling a robot to manipulate a workpiece. Even when, for example, the same task is performed, the level of fatigue of a human varies and the level of burden also varies depending on the velocity or the distance from the human. It is, therefore, preferable to set an appropriate method for controlling a robot. However, numerous methods are available to control a robot. In addition, a human may exhibit different action patterns, depending on the work that is being carried out. This makes it difficult to set an optimal method for controlling a robot in accordance with the working details.

SUMMARY OF INVENTION

According to a first aspect of the invention, there is provided a machine learning device for a robot that allows a human and the robot to work cooperatively, the machine learning device including a state observation unit that observes a state variable representing a state of the robot during a period in that the human and the robot work cooperatively; a determination data obtaining unit that obtains determination data for at least one of a level of burden on the human and a working efficiency; and a learning unit that learns a training data set for setting an action of the robot, based on the state variable and the determination data.

The state variable may include at least one of a position, an orientation, a velocity, and an acceleration of the robot. The determination data preferably includes at least one of a magnitude and a direction of a load sensed by the robot, a magnitude and a direction of a load sensed by an environment surrounding the robot, a level of burden on the environment surrounding the robot, and a time taken to move the robot.

The training data set may include an action value variable representing a value of an action of the robot set for each state of the robot and each action of the robot, and the learning unit may include a reward computation unit that sets a reward, based on the determination data and the state variable; and a function update unit that updates the action value variable, based on the reward and the state variable. The reward computation unit may set a greater reward for a smaller absolute value of an acceleration of the robot, and a greater reward for a shorter time taken to move the robot.

The training data set may include a learning model for the robot set for each state of the robot and each action of the robot, and the learning unit may include an error computation unit that computes an error of the learning model, based on the determination data, the state variable, and input teacher data; and a learning model update unit that updates the learning model, based on the error and the state variable. The machine learning device may further include a human identification unit that identifies a human who works cooperatively with the robot, wherein the training data set may be created for each human, and the learning unit may learn the training data set for the identified human. The machine learning device may include a neural network. The robot may include one of an industrial robot, a field robot, and a service robot.

According to a second aspect of the invention, there is provided a robot controller including the machine learning device as described above; and an action control unit that controls an action of the robot, the machine learning device including a decision unit that sets an action of the robot, based on the training data set, wherein the action control unit controls the action of the robot, based on a command from the decision unit.

According to a third aspect of the invention, there is provided a robot system including the robot controller as described above; a robot that assists a human in work; and an end effector attached to the robot. The robot may include a force detector that outputs a signal corresponding to a force from the human; and a state detector that detects a position and an orientation of the robot, the determination data obtaining unit may obtain the determination data, based on output of the force detector, and the state observation unit may obtain the state variable, based on output of the state detector. The state detector may include at least one of a motion sensor, a pressure sensor, a torque sensor for a motor, and a contact sensor. The robot system may further include a plurality of robots; a plurality of robot controllers; and a communication line that connects the plurality of robot controllers to each other, wherein each of the plurality of robot may control independently learns the training data set for a robot controlled by the robot controller and send and share learned information via the communication line.

According to a fourth aspect of the invention, there is provided a machine learning method for a robot that allows a human and the robot to work cooperatively, the machine learning method including the steps of observing a state variable representing a state of the robot during a period in that the human and the robot work cooperatively; obtaining determination data for at least one of a level of burden on the human and a working efficiency; and learning a training data set for setting an action of the robot, based on the state variable and the determination data.

BRIEF DESCRIPTION OF THE DRAWINGS

The present invention will be more clearly understood by reference to the accompanying drawings, in which.

DETAILED DESCRIPTION

A machine learning device, a robot controller, a robot system, and a machine learning method according to an embodiment will be described below with reference to the accompanying drawings. However, it is to be understood that the present invention should be limited neither to the drawings nor to the following embodiment.

The robot system allows a human and a robot to cooperate together to perform a predetermined task. This embodiment illustrates how a human and a robot cooperate together to transport a workpiece.

Figure 1:
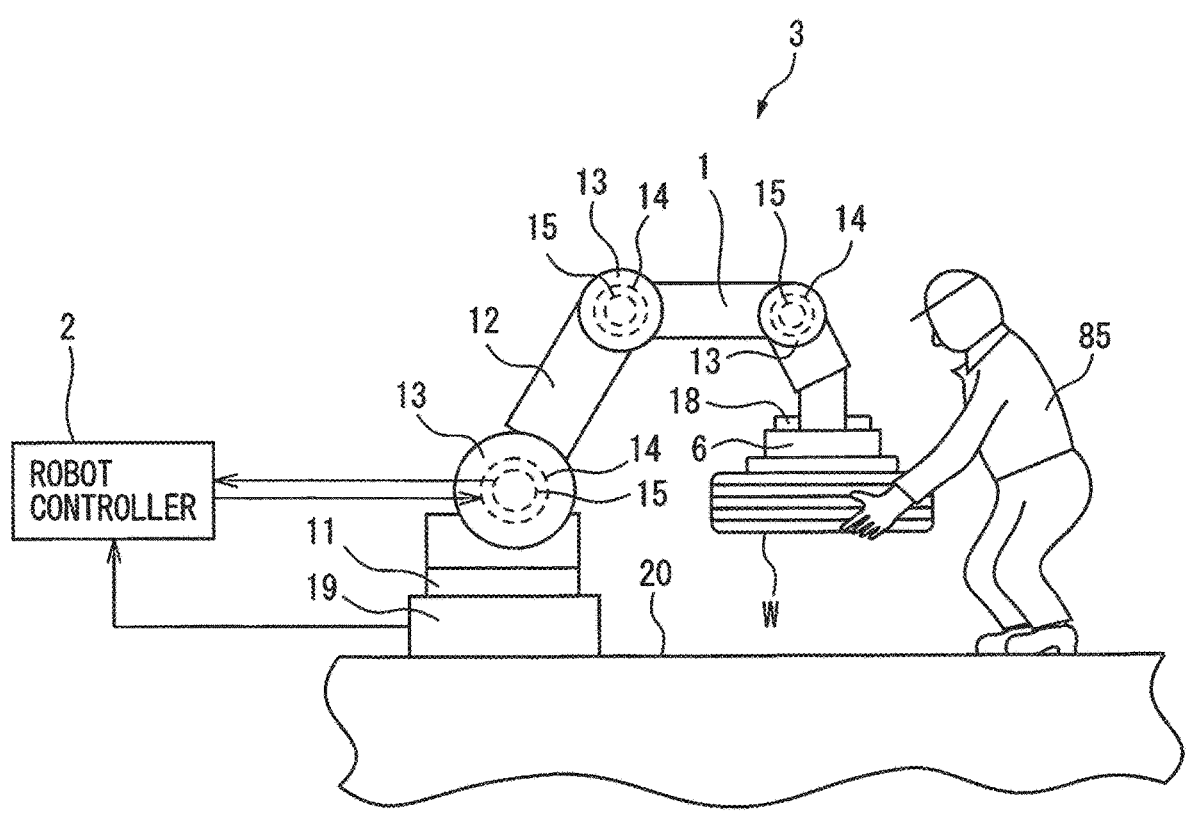
FIG. 1 is a view schematically illustrating how a robot and a human work cooperatively in an embodiment.
Figure 2:
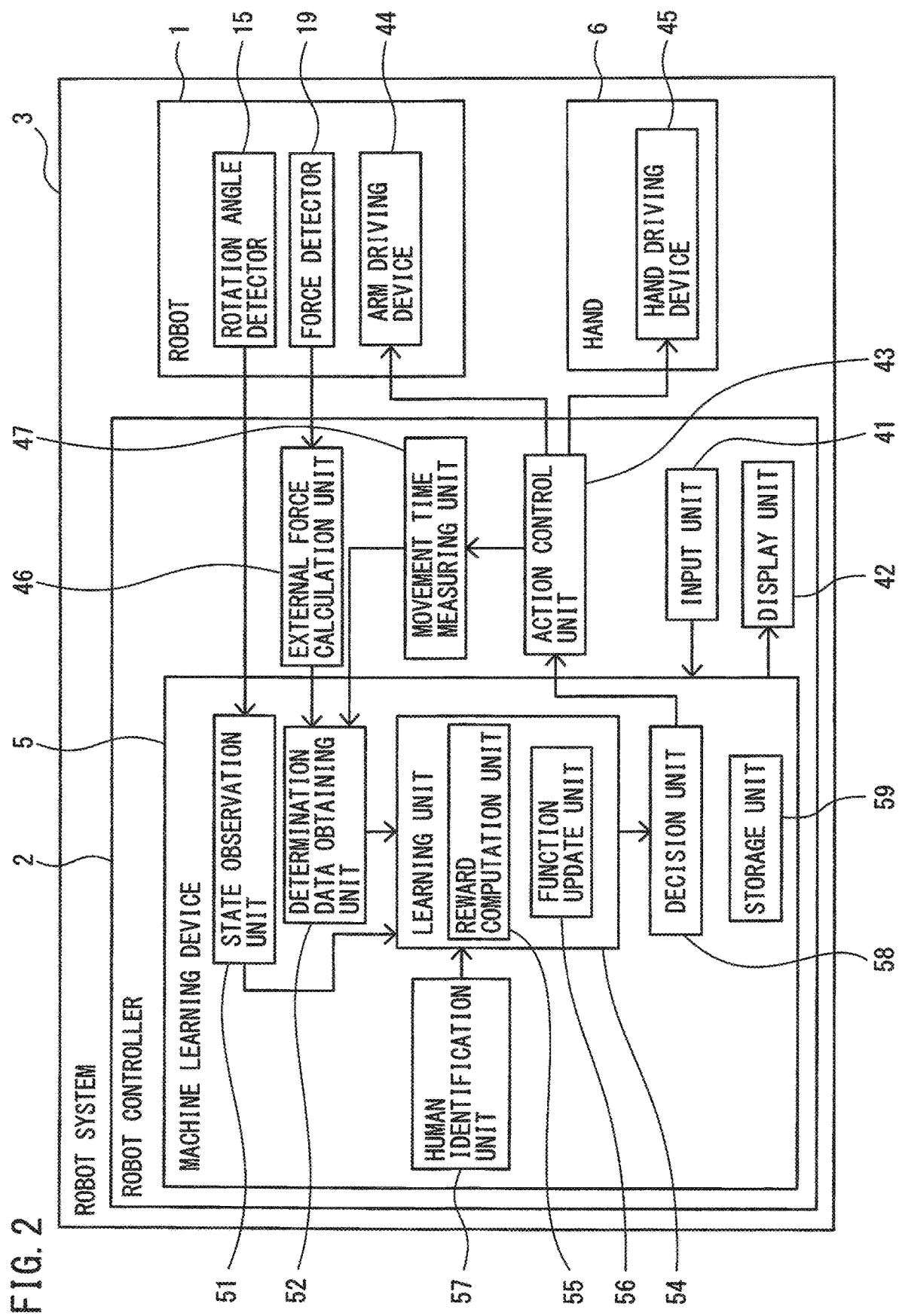
FIG. 2 is a block diagram illustrating an exemplary robot system in the embodiment.

FIG. 1 is a schematic view illustrating the robot system in this embodiment. FIG. 2 is a block diagram illustrating an exemplary robot system in this embodiment. Referring to FIG. 1 and FIG. 2, a robot system 3 includes a robot 1 which assists in transporting a workpiece W, and a robot controller 2 which controls the robot 1. The robot 1 according to this embodiment is implemented in a multi-articulated robot including an arm 12 and a plurality of joint portions 13. The robot system 3 includes a hand 6 serving as an end effector attached to the robot 1. The hand 6 has the function of gripping and releasing the workpiece W. The end effector is not limited to a hand, and an end effector appropriate to the working details may be used.

The robot 1 includes an arm driving device 44 which drives the joint portions 13. The arm driving device 44 includes arm driving motors 14 built into the joint portions 13. The arm driving motors 14 can drive and bend the arm 12 at desired angles in the joint portions 13. The robot 1 in this embodiment is assembled such that the entire arm 12 can rotate about an axis which extends vertically. The arm driving motors 14 include motors which rotate the arm 12.

The robot 1 includes a hand driving device 45 which closes and opens the hand 6. The hand driving device 45 in this embodiment includes a hand driving cylinder 18 which drives the hand 6, and an air pump and a solenoid valve for supplying compressed air to the hand driving cylinder 18.

The robot 1 includes a base portion 11 which supports the arm 12. The robot 1 in this embodiment includes a force detector 19 which detects a force acting on the base portion 11. The force acting on the base portion 11 corresponds to the force acting on the robot 1. The force detector 19 outputs a signal corresponding to a force applied by a human. The force detector 19 in this embodiment is fixed to a floor surface 20.

The force detector 19 may be any detector capable of detecting the magnitude and direction of the force acting on the robot 1. The force detector 19 in this embodiment includes a metal substrate connected to the base portion 11, and a strain sensor attached to the substrate surface. The force detector 19 can calculate a force acting on the robot 1, based on the amount of deformation detected by the strain sensor.

The robot 1 in this embodiment includes a state detector which detects the robot position and orientation. The state detector detects the position of the robot tip point and the orientation of the robot 1. The state detector in this embodiment includes a rotation angle detector 15 attached to each arm driving motor 14. The rotation angle detector 15 detects the angle of rotation at which each arm driving motor 14 is driven. The position, orientation, velocity, and acceleration of the robot 1 can be detected based on the angles of rotation of the arm driving motors 14.

The state detector may be not only the rotation angle detector 15 but also, e.g., a camera, a motion sensor, a pressure sensor, a torque sensor for a motor, and a contact sensor. In other words, the state variable observed by the state observation unit 51 may be not only the output of the rotation angle detector 15 but also data (state quantity) obtained from, e.g., a camera, a motion sensor, a pressure sensor, a torque sensor for a motor, and a contact sensor. These detectors such as a camera, a motion sensor, a pressure sensor, a torque sensor for a motor, and a contact sensor may be, for example, directly placed in predetermined portions of the robot 1 (hand 6) or mounted in appropriate portions around the robot 1, as a matter of course.

The robot 1 is driven based on an operation command for the robot controller 2. The robot controller 2 includes an arithmetic processor including, e.g., a CPU (Central Processing Unit), a RAM (Random Access Memory), and a ROM (Read Only Memory) connected to each other via buses. The robot controller 2 includes a storage unit 59 which stores various types of information. The robot controller 2 includes an action control unit 43 which controls the arm driving device 44 and the hand driving device 45. The arm driving device 44 and the hand driving device 45 are driven in accordance with an operation command from the action control unit 43.

The robot controller 2 in this embodiment includes an external force calculation unit 46 which estimates an external force applied to the robot 1 from the outside of the robot 1. The force detected by the force detector 19 includes an internal force generated by the mass of the robot 1 and the operation of the robot 1, and an external force applied to the robot 1 from the outside of the robot 1.

The external force calculation unit 46 calculates an internal force acting on the robot 1 by the self weight of the robot 1 as the robot 1 operates while no force is applied from the outside of the robot 1. An internal force can be calculated based on the position and orientation of the robot 1 detected based on the output of the rotation angle detector 15 in combination of the mass of the robot 1 and other factors. The mass of the robot 1 and other factors can be stored in the storage unit 59 in advance. The external force calculation unit 46 subtracts the internal force from the force detected by the force detector 19 to calculate an external force. The external force corresponds to the force applied to a workpiece by a human 85.

The robot controller 2 includes an input unit 41 and a display unit 42. The display unit 42 can display information concerning the operation of the robot 1. Examples of the display unit 42 may include a liquid crystal display. The input unit 41 allows a human to input a desired command to the robot controller 2. Examples of the input unit 41 may include a keyboard.

Figure 5:
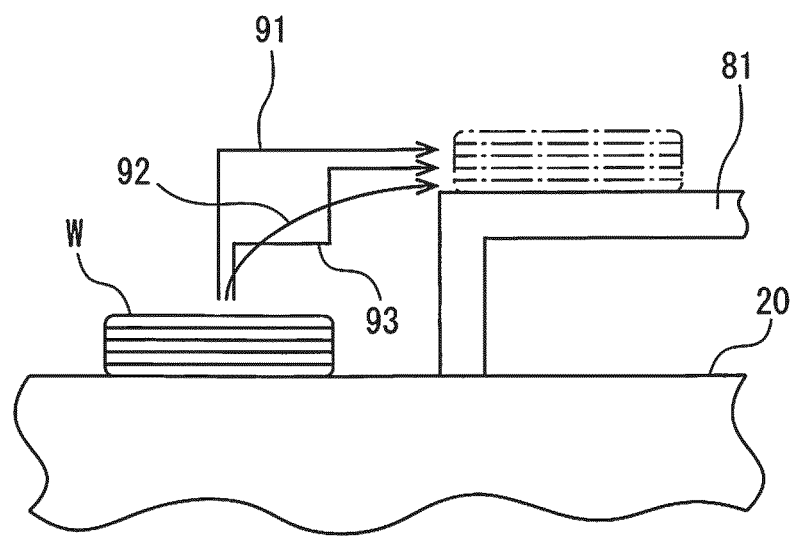
FIG. 5 is a schematic view for explaining a path for transporting a workpiece.

FIG. 5 is a schematic view for explaining a path for transporting a workpiece in the robot system according to this embodiment. Referring to FIG. 1 and FIG. 5, in this embodiment, the workpiece W placed on the floor surface 20 is transported onto the upper surface of a worktable 81. The workpiece W is, for example, a heavy workpiece. It may be very exhaustive or difficult for the human 85 to transport such a workpiece. The workpiece W in this embodiment serves as an automobile tire.

In transporting the workpiece W, multiple paths for transporting the workpiece W are available, as indicated by arrows 91 to 93. The human 85 experiences an interval, wherein the human may preferably exert a great force or an interval, and wherein the human may exert only a small force. Even when the workpiece W is set at the same position, the robot 1 may have various orientations.

Referring to FIG. 2, the robot controller 2 in this embodiment includes a machine learning device 5 which learns the action pattern of a human and, in turn, learns a method for controlling a robot to appropriately assist the human. The machine learning device 5 in this embodiment selects an action of the robot 1 determined to be optimal at a predetermined moving point during the period in which the robot 1 is driven. In other words, the machine learning device 5 sends a command to drive the robot 1 in a driving pattern determined to be optimal.

The machine learning device 5 includes a state observation unit 51 which obtains a state variable representing the state of the robot 1 during the period in which the human 85 and the robot 1 work cooperatively. The state variable in this embodiment includes the position, orientation, velocity, and acceleration of the robot 1. For example, the position, velocity, and the acceleration at the robot tip point may be used as state variables. The position, orientation, velocity, and acceleration of the robot 1 can be detected based on the output of the rotation angle detector 15. A signal output from the rotation angle detector 15 is input to the state observation unit 51.

The state variable is not limited to this form but may be any variables representing the robot state. For example, the state observation unit 51 may obtain at least one variable of the position, orientation, velocity, and acceleration of the robot 1.

The machine learning device 5 includes a determination data obtaining unit 52 which obtains determination data associated with the burden on the human 85. The determination data in this embodiment includes the magnitude and direction of the force applied by the human 85 to transport the workpiece W. The determination data in this embodiment further includes the time taken to move the workpiece W.

The determination data obtaining unit 52 in this embodiment obtains determination data, based on the output of the force detector 19. The magnitude of the external force calculated by the external force calculation unit 46 corresponds to the magnitude of the force applied by the human 85. The direction of the external force calculated by the external force calculation unit 46 corresponds to the direction of the force applied to the workpiece W by the human 85. The determination data obtaining unit 52 receives the magnitude and direction of the force applied by the human 85 from the external force calculation unit 46.

The robot controller 2 includes a movement time measuring unit 47 which measures the working time. The movement time measuring unit 47 in this embodiment calculates the time taken to move between moving points (to be described later). The movement time measuring unit 47 in this embodiment calculates the movement time, based on a command from the action control unit 43. The movement time measured by the movement time measuring unit 47 is sent to the determination data obtaining unit 52.

The determination data is not limited to the above-mentioned form but may be any data associated with at least one of the level of burden on the human and the working efficiency. For example, the determination data may be not only, e.g., the magnitude and direction of a load sensed by the robot, the magnitudes and directions of loads sensed by surrounding humans or objects, the levels of burden on the surrounding humans or objects, and the movement time, but also pieces of information from, e.g., a camera, a motion sensor, and a pressure sensor. In this specification, the human includes not only an operator who actually performs processing (task) cooperatively with the robot, but also various humans such as a human who observes the processing around the robot or a human who happens to pass near the robot, although they do not directly operate the robot.

The machine learning device 5 in this embodiment includes a learning unit 54 which learns a training data set for setting the action of the robot, based on the state variable and the determination data. The learning unit 54 obtains the state variable from the state observation unit 51. The learning unit 54 further obtains the determination data from the determination data obtaining unit 52. The training data set means a set of pieces of value information associated with actions defined based on the state variable and the determination data. The machine learning device 5 can set a method for driving the robot by comparing values associated with the state and the action in the training data set. This embodiment is not limited to an industrial robot and is also applicable to, e.g., a field robot or a service robot, as a matter of course.

The machine learning device will be described hereinafter. The machine learning device has the function of extracting, e.g., a useful rule, a knowledge representation, and a determination criterion by analysis from a set of data input to the device, outputting the determination results, and learning knowledge (machine learning). A variety of machine learning techniques are available, which are roughly classified into, e.g., "supervised learning," "unsupervised learning," and "reinforcement learning." To implement these techniques, another technique called "deep learning" in which extraction of feature amounts themselves is learned is available.

The machine learning device 5 illustrated as FIG. 2 uses "reinforcement learning," and a machine learning device 7 (to be described later with reference to FIG. 9) uses "supervised learning." Although these types of machine learning (machine learning devices 5 and 7) may use a general-purpose computer or processor, the use of, e.g., GPGPU (General-Purpose computing on Graphics Processing Units) or large-scale PC clusters allows higher-speed processing.

First, in supervised learning, teacher data, i.e., a large number of sets of data of certain inputs and results (labels) are fed into a machine learning device, which learns features observed in these data sets and inductively acquires a model (learning model) for estimating the result from the input, i.e., their relationship. Supervised learning can be implemented using an algorithm such as a neural network (to be described later).

In unsupervised learning, only input data are fed into a learning device in large amounts, which learns the distribution of the input data and, in turn, performs learning with a device which, e.g., compresses, classifies, and shapes the input data, without corresponding teacher output data being fed into the learning device. This allows, e.g., clustering of features seen in these data sets into similar features. The obtained result can be used to define certain criteria and allocate outputs in an optimizing manner according to the criteria, thus predicting an output.

Intermediate problem setting between unsupervised learning and supervised learning, called semi-supervised learning, is also available. This applies when, for example, only some data serve as data sets of inputs and outputs and the remaining data include only inputs. In this embodiment, learning can be efficiently performed by applying data (e.g., image data or simulation data) which can be obtained even without actual movement of the robot to unsupervised learning.

Reinforcement learning will be described below. Reinforcement learning problem setting will be considered as follows:

The robot observes the environmental state to decide its action;

The environment may change according to a certain rule and a human may change the environment by his or her own action;

A reward signal is returned every time action is taken;

The sum of (discount) rewards in the future is to be maximized;

Learning starts in a state in which a result to be brought about by the action is totally unknown or known only incompletely. In other words, the robot can obtain the result of an action as data only after it actually takes action. This means that an optimal action may be preferably searched for by trial and error; and As if imitating human behaviors, learning can be started from a good starting point by starting from an initial state in which learning has been performed in advance (a technique such as the above-mentioned supervised learning or reverse reinforcement learning).

In reinforcement learning, in addition to determination and classification, an action is learned to acquire a method for learning an appropriate action in consideration of interactions exerted on the environment by the action, i.e., learning to maximize the reward to be obtained in the future. Although this description will be followed by an example of Q-learning, the present invention is not limited to this.

In Q-learning, a value Q(s, a) of selection of an action a is learned in a particular environmental state s. In other words, an action a having the highest value Q(s, a) in the particular state s may be preferably selected as an optimal action. However, at first, a correct value Q(s, a) is totally unknown for a pair of a state s and an action a. The agent (the subject of an action) selects various actions a in the particular state s and rewards are offered for the actions a. With this operation, the agent learns to select a better action, i.e., a correct value Q(s, a).

To maximize the sum of rewards to be obtained in the future as a result of the actions, $Q(s, a)=E[\Sigma(\gamma^t)r_t]$ is to be finally satisfied, where E[ ] is the expected value, t is time, γ is a parameter called the discount rate (to be described later), $r_t$ is the reward at time t, and Σ is the sum at time t. The expected value in this expression is taken in response to a change in state that follows an optimal action and is an unknown value, which is learned by a search. An update expression of such a value Q(s, a) is given by, e.g.:

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

where $s_t$ is the environmental state at time t and $a_t$ is the action at time t. Upon the action $a_t$, the state changes to $s_{t+1}$. $r_{t+1}$ is the reward received upon a change in state. The term attached with max is the product of the Q-value multiplied by γ when an action a having the highest Q-value known in the state $s_{t+1}$ is selected. γ is a parameter called the discount rate, satisfying 0<γ≤1. α is a learning factor satisfying 0<α≤1.

Expression (1) represents a method for updating the evaluation value $Q(s_t, a_t)$ of the action $a_t$ in the state $s_t$, based on the reward $r_{t+1}$ returned as a result of the trial $a_t$. More specifically, when the sum of the reward $r_{t+1}$ and the evaluation value $Q(s_{t+1}, \max a_{t+1})$ of the best action max a in the state subsequent to the state s upon the action a is greater than the evaluation value $Q(s_t, a_t)$ of the action a in the state s, $Q(s_t, a_t)$ is increased; otherwise, $Q(s_t, a_t)$ is reduced. In other words, the value of a particular action in a particular state is brought close to the reward immediately returned as a result, and the value of the best action in the subsequent state upon the particular action.

Methods for representing Q (s, a) on the computer include a method for holding the numerical values of all state-action pairs (s, a) in the form of a table and a method for providing a function that approximates Q(s, a). With the latter method, above-mentioned expression (1) can be implemented by adjusting the parameter of an approximation function using a technique such as the stochastic gradient descent method. A neural network (to be described later) can be used as the approximation function.

Figure 3:
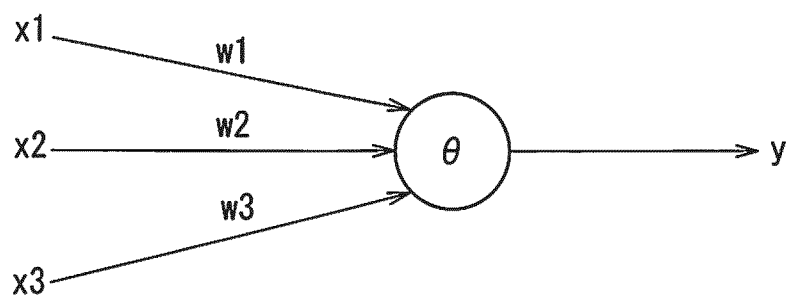
FIG. 3 is a diagram schematically representing a model for a neuron.
Figure 4:
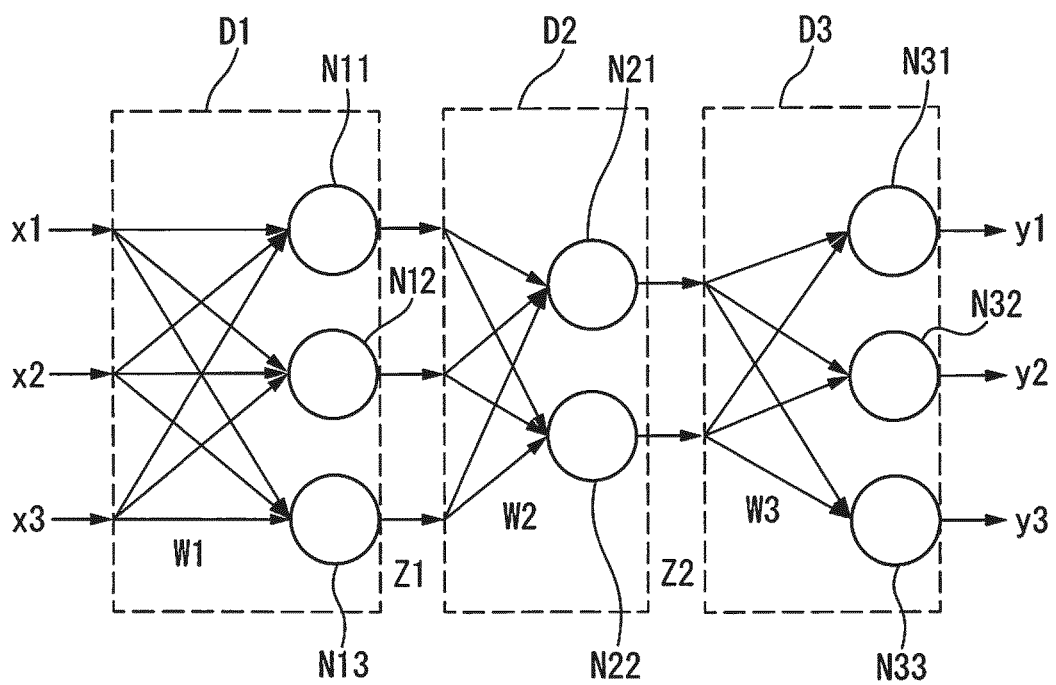
FIG. 4 is a diagram schematically representing a three-layer neural network formed by combining neurons as illustrated as FIG. 3 together.

Neural networks can also be used as learning models for supervised learning and unsupervised learning or approximation algorithms for value functions in reinforcement learning. FIG. 3 is a diagram schematically representing a model for a neuron, and FIG. 4 is a diagram schematically representing a three-layer neural network formed by combining neurons as illustrated as FIG. 3 together. More specifically, the neural network is implemented by, e.g., an arithmetic device and a memory imitating a model for a neuron as illustrated as, e.g., FIG. 3.

As illustrated as FIG. 3, the neurons serve to output an output (result) y for a plurality of inputs x (FIG. 3 illustrates inputs x1 to x3 as an example). Each input x (x1, x2, x3) is multiplied by a weight w (w1, w2, w3) corresponding to the input x. With this operation, the neurons output results y given by:

$$y=f_k(\Sigma_{i=1}^n x_i w_i - \theta) \quad (2)$$

where $\theta$ is the bias and $f_k$ is the activation function. Note that all of the input x, the result y, and the weight w are vectors.

A three-layer neural network formed by combining neurons as illustrated as FIG. 3 together will be described below with reference to FIG. 4. A plurality of inputs x (inputs x1 to x3 are taken as an example herein) are input from the left of the neural network and results y (results y1 to y3 are taken as an example herein) are output from the right of this network, as illustrated as FIG. 4. More specifically, the inputs x1, x2, and x3 are multiplied by a weight corresponding to each of three neurons N11 to N13 and then are input to the neurons. The weights used to multiply these inputs are collectively referred to as W1 herein.

The neurons N11 to N13 output z11 to z13, respectively. Referring to FIG. 4, z11 to z13 are collectively referred to as feature vectors Z1 and may be regarded as vectors obtained by extracting the feature amounts of input vectors. The feature vectors Z1 are defined between the weights W1 and W2. Z11 to z13 are multiplied by a weight corresponding to each of two neurons N21 and N22 and are then input to the neurons. The weights used to multiply these feature vectors are collectively referred to as W2 herein.

The neurons N21 and N22 output z21 and z22, respectively. Referring to FIG. 4, z21 and z22 are collectively referred to as feature vectors Z2. The feature vectors Z2 are defined between the weights W2 and W3. z21 and z22 are multiplied by a weight corresponding to each of three neurons N31 to N33 and input. The weights used to multiply these feature vectors are collectively referred to as W3 herein.

Lastly, the neurons N31 to N33 output results y1 to y3, respectively. The operation of the neural network includes a learning mode and a value prediction mode. For example, the weight W is learned using a learning data set in the learning mode, and a robot action is determined in the prediction mode using the parameter. Although "prediction" has been referred to above for the sake of convenience, a variety of tasks such as detection, classification, and inference are possible, as a matter of course.

Data obtained by actually operating the robot in the prediction mode can be immediately learned and reflected on the subsequent action (online learning), or a group of data collected in advance can be used to perform collective learning and to subsequently execute the detection mode using the same parameters (batch learning). As another, intermediate approach, the learning mode can be interposed every time a certain amount of data is accumulated.

The weights W1 to W3 can be learned by the error backpropagation method. The information of errors enters from the right and flows to the left. The error backpropagation method is used to adjust (learn) each weight to reduce the difference between the true output y (teacher) and the output y when the input x is input.

Such a neural network can have more than three layers (called deep learning). It is possible to automatically acquire from only teacher data an arithmetic device which extracts features of the input stepwise and returns a result. The machine learning device 5 according to an embodiment includes, e.g., a state observation unit 51, a learning unit 54, and a decision unit 58, as illustrated as FIG. 2, to execute the above-described Q-learning. However, the machine learning method applied to the present invention is not limited to Q-learning, as mentioned earlier. In other words, various techniques such as "supervised learning," "unsupervised learning," "semi-supervised learning," and "reinforcement learning (reinforcement learning other than Q-learning)" that can be used by the machine learning device are applicable.

Figure 6:
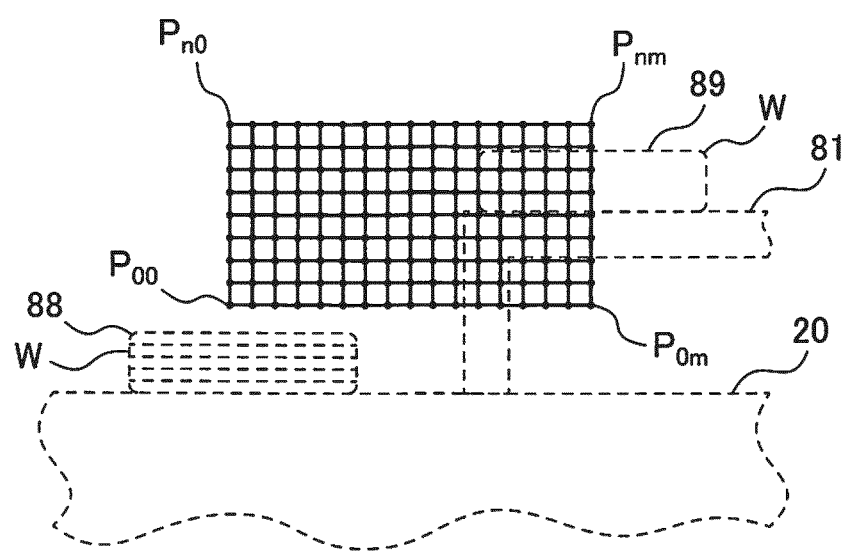
FIG. 6 is a view for explaining moving points for the robot tip point.

FIG. 6 depicts a schematic view for explaining moving points in this embodiment. FIG. 6 illustrates an example in which the robot tip point moves on a two-dimensional plane for the sake of descriptive simplicity. The workpiece W is transported from an initial position 88 to a target position 89. Moving points P are set in a checkerboard pattern in a region to which the robot tip point is likely to move. The moving point P is defined as a point passed by the robot tip point. The robot tip point moves from a moving point $P_{00}$ corresponding to the initial position 88 to a moving point $P_{nm}$ corresponding to the target position 89.

Figure 7:
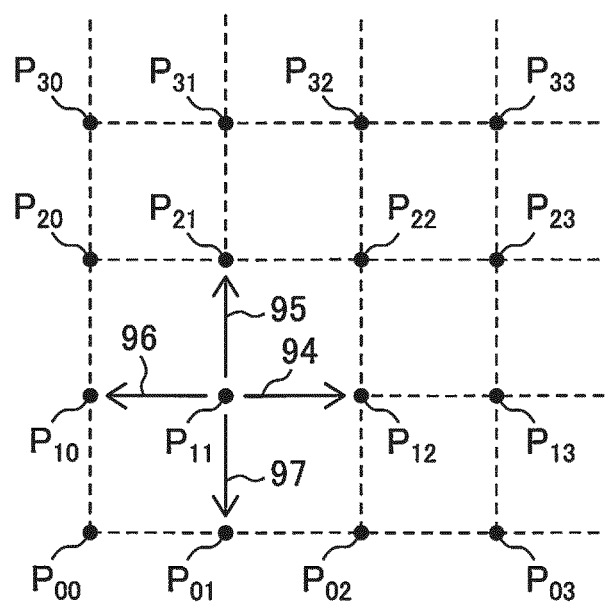
FIG. 7 is an enlarged view for explaining moving points for the robot tip point.

FIG. 7 depicts a schematic view for explaining how the robot tip point moves. In this embodiment, the moving direction of the robot tip point is preset for each moving point P. The robot tip point moves in directions indicated by arrows 94 to 97. When the robot tip point is located at one moving point P, it moves to another adjacent moving point P upon the subsequent action. In the example illustrated as FIG. 7, when the robot tip point is located at the moving point $P_{11}$, it moves to the moving point $P_{12}$, $P_{21}$, $P_{10}$, or $P_{01}$.

In this embodiment, reinforcement learning which uses the above-mentioned Q-learning is performed among a variety of machine learning methods. The training data set in this embodiment includes a plurality of action value variables Q. In this embodiment, various techniques such as "supervised learning," "unsupervised learning," "semi-supervised learning," and "reinforcement learning (including Q-learning)" are applicable, as mentioned earlier.

In this embodiment, the state $s_t$ corresponds to the state variable of the robot 1. In other words, the state $s_t$ includes, e.g., the position, orientation, velocity, and acceleration of the robot 1. The action $a_t$ corresponds to, e.g., movement of the robot tip point in the directions indicated by the arrows 94 to 97. The action $a_t$ includes, e.g., the position, orientation, velocity, and acceleration of the robot 1 for movement in the directions indicated by the arrows 94 to 97.

The learning unit 54 in this embodiment updates the action value variables Q every time a workpiece W is transported. The learning unit 54 includes a reward computation unit 55 which sets a reward, and a function update unit 56 which updates the action value variables Q. The reward computation unit 55 sets the reward $r_t$, based on the determination data obtained by the determination data obtaining unit 52. The reward computation unit 55 may set the reward $r_t$, based on the state variable obtained by the state observation unit 51.

The reward computation unit 55 can set a greater reward $r_t$ for a lower burden (level of burden) on the human and a higher working efficiency. When, for example, the workpiece W considerably decelerates or accelerates, the burden on the human increases, thus degrading the working efficiency. More specifically, the smaller the absolute value of the acceleration (acceleration magnitude) of the robot 1, the lower the burden on the human, and the higher the working efficiency. Alternatively, when the absolute value of the acceleration is large, it can be determined that the robot 1 is in an undesirable state because of the rapid operation of the robot 1. Thus, the reward computation unit 55 can set a greater reward for a smaller absolute value of the acceleration of the robot 1. The force applied by the human is preferably as small as possible. The reward computation unit 55 may set a greater reward for a smaller force applied by the human (external force applied to the robot).

The shorter the working time to transport the workpiece W from the initial position 88 to the target position 89, the lower the burden on the human, and the higher the working efficiency. Therefore, the reward computation unit 55 sets a greater reward for a shorter time taken to move between moving points P. In the form illustrated as FIG. 5, the transport path gets longer when the workpiece W is moved downward. Thus, the reward computation unit 55 sets a poor reward when the robot tip point moves downward or the human applies a force downwards. The level of burden on the human not only means the burden on the human itself but also includes loads based on various factors, such as unexpected contact and pressing of the human, and may even include the level of burden placed not only on the human but also, e.g., surrounding objects.

In addition, the reward computation unit 55 can set a reward, based on any action of the human. When, for example, the workpiece W collides against the worktable 81, the reward computation unit 55 can set a poor positive reward or a negative reward.

In reward setting, for example, the human can preset the value of a reward for a variable such as the magnitude of the force and store it in a storage unit 59. The reward computation unit 55 can read and set the reward stored in the storage unit 59. Alternatively, the human may store an arithmetic expression for calculating a reward in the storage unit 59 in advance, and the reward computation unit 55 may calculate a reward, based on the arithmetic expression.

The function update unit 56 updates the action value variables Q using above-mentioned expression (1) or (2). In other words, the value of the action of the robot at a predetermined moving point is updated based on the actual action of the robot and the force applied by the human.

The human can preset the initial values of the action value variables Q at each moving point P. Alternatively, the human may preset random initial values.

The machine learning device 5 includes a decision unit 58 which sets an action of the robot 1, based on a training data set. The decision unit 58 in this embodiment sets an action of the robot 1, based on the action value variables Q updated by the learning unit 54. For example, the decision unit 58 can select an action having the largest action value variables Q. Reinforcement learning in this embodiment uses the ε-greedy method. In the ε-greedy method, the decision unit 58 sets a random action at a predetermined probability ε. The decision unit 58 further sets an action having the maximum action value variables Q at a probability (1−ε. In other words, the decision unit 58 selects an action different from that considered to be optimal at the probability ε. This method may allow discovery of a robot action more excellent than that determined to be optimal.

A command for the action of the robot 1 set by the decision unit 58 is sent to the action control unit 43. The action control unit 43 controls the robot 1 and the hand 6, based on the command from the decision unit 58.

In this manner, a machine learning method according to this embodiment includes the steps of obtaining a state variable representing the state of a robot during the period in which a human and the robot work cooperatively, and obtaining determination data for at least one of the level of burden on the human and the working efficiency. The machine learning method further includes the step of learning a training data set for determining an action of the robot, based on the state variable and the determination data.

The machine learning device and the machine learning method according to this embodiment allow learning of a method for controlling a robot, based on the action pattern of a human, by repeated transportation of the workpiece W. This makes it possible to set an optimal method for controlling a robot, which involves less burden on a human, high working efficiency, and a short working time.

Machine learning by the machine learning device and the machine learning method is not limited to the above-mentioned form but may be any form of machine learning. For example, the machine learning device may set an optimal action using a multi-layer neural network formed by deep learning. Instead of using a table representing action value variables as functions of a plurality of actions and a plurality of states, a neural network can be used which outputs action value variables for each action taken when a predetermined state is given.

In the above-mentioned embodiment, moving points are arranged in a checkerboard pattern. However, moving points are not limited to this form and may be set in any form. Further, reducing the interval between moving points allows a smooth robot operation. In the above-mentioned embodiment, the robot moves two-dimensionally because moving points are set on a plane. However, arranging moving points in a three-dimensional space allows the robot to move three-dimensionally.

Referring to FIG. 5, the machine learning device 5 in this embodiment includes a human identification unit 57 which identifies a human. A human-specific training data set is created in advance. The storage unit 59 stores the human-specific training data set. In this embodiment, the human 85 inputs a human-specific number to the input unit 41. The human identification unit 57 reads a training data set corresponding to the human from the storage unit 59, based on the input number. The learning unit 54 learns the training data set corresponding to the human. This control allows human-specific setting of a method for controlling a robot based on the action pattern of a human. In other words, optimal robot control can be performed for each human. Various people exist such as tall humans, short humans, humans having strong lower-body muscles, and humans having strong arm muscles. Optimal robot control can be achieved in accordance with each such human.

Control for identifying a human is not limited to the above-mentioned form but may use any method. For example, the machine learning device may be equipped with a number reader. The human takes a card inscribed with an individual number. The number reader reads the number and sends a result to the human identification unit. The human identification unit can identify the human, based on the read number.

Figure 8:
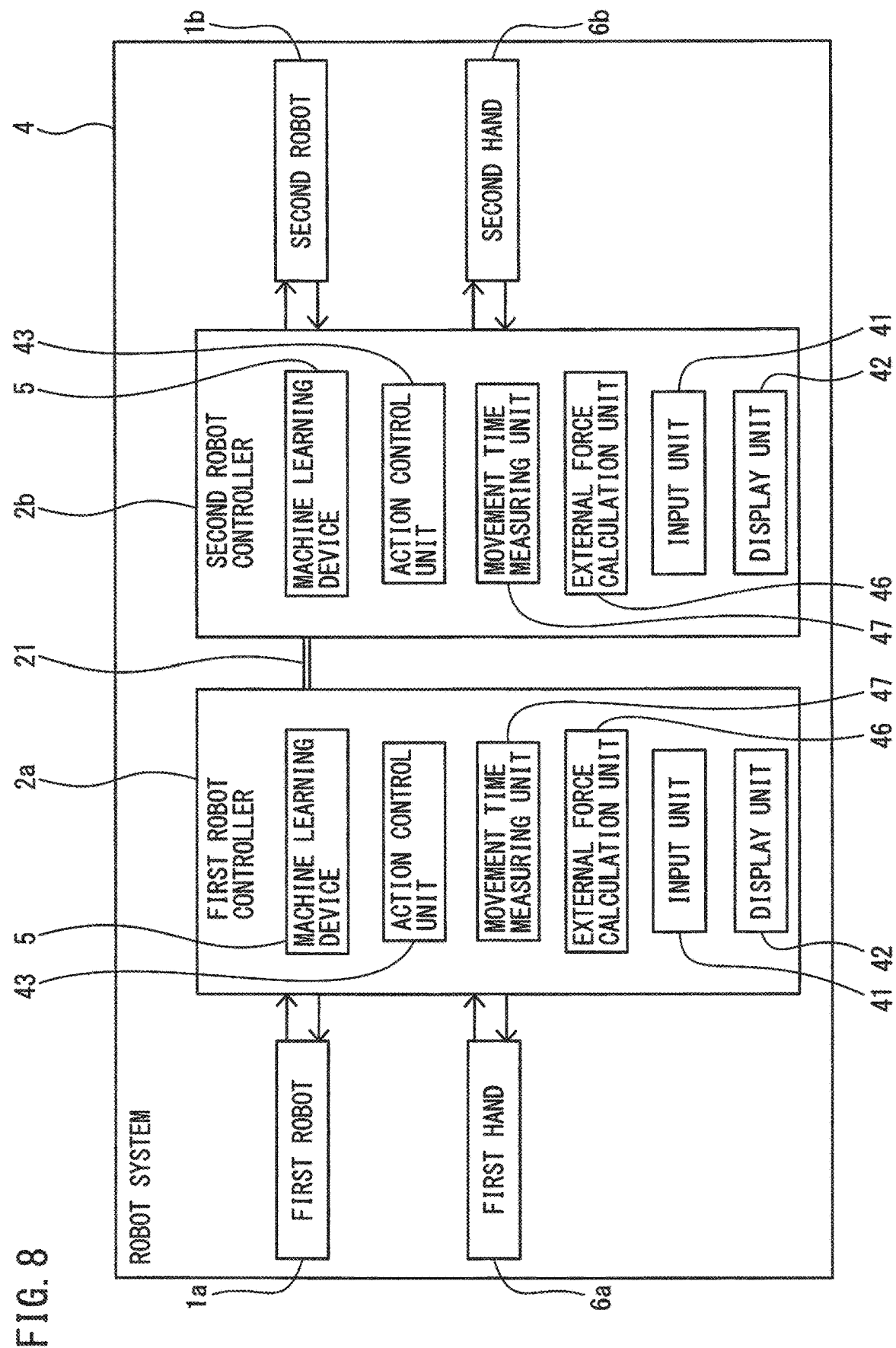
FIG. 8 is a block diagram illustrating another exemplary robot system in the embodiment.

FIG. 8 is a block diagram illustrating another robot system in this embodiment. In another robot system (manufacturing system) 4, distributed learning is performed. The other robot system 4 includes a plurality of robots and a plurality of robot controllers, as illustrated as FIG. 8. The robot system 4 includes a first robot 1*a* and a second robot 1*b*. The robot system 4 includes a first hand 6*a* attached to the first robot 1a, and a second hand 6b attached to the second robot 1b. In this manner, the other robot system 4 includes two robots 1a and 1b and two hands 6a and 6b.

The robot system 4 includes a first robot controller 2a which controls the first robot 1a, and a second robot controller 2b which controls the second robot 1b. The first robot controller 2a and the second robot controller 2b have the same configuration as the above-mentioned robot controller 2. The plurality of robot controllers 2a and 2b are connected to each other via a communication device including a communication line 21. The communication device can perform communication via, e.g., Ethernet®. The robot controllers 2a and 2b are capable of mutual information exchange through communication.

In the robot system 4, the plurality of robots 1a and 1b and the human work cooperatively. In the example illustrated as FIG. 8, two robots assist the human in work. The first robot controller 2a independently learns to control the first robot 1a. The second robot controller 2b independently learns to control the second robot 1b. Pieces of information learned by the respective robot controllers are transmitted to each other via the communication line 21.

In this manner, pieces of information learned by the respective robot controllers 2a and 2b can be shared by the first robot controller 2a and the second robot controller 2b. This control allows sharing of, e.g., action patterns for learning to increase the number of learning operations. This can improve the learning accuracy.

The above-described embodiment illustrates a cooperative task for transporting the workpiece W. However, the cooperative task is not limited to this form but may be any cooperative task. Examples may include a task for assembling one part into a predetermined device by cooperation between a robot and a human.

Figure 9:
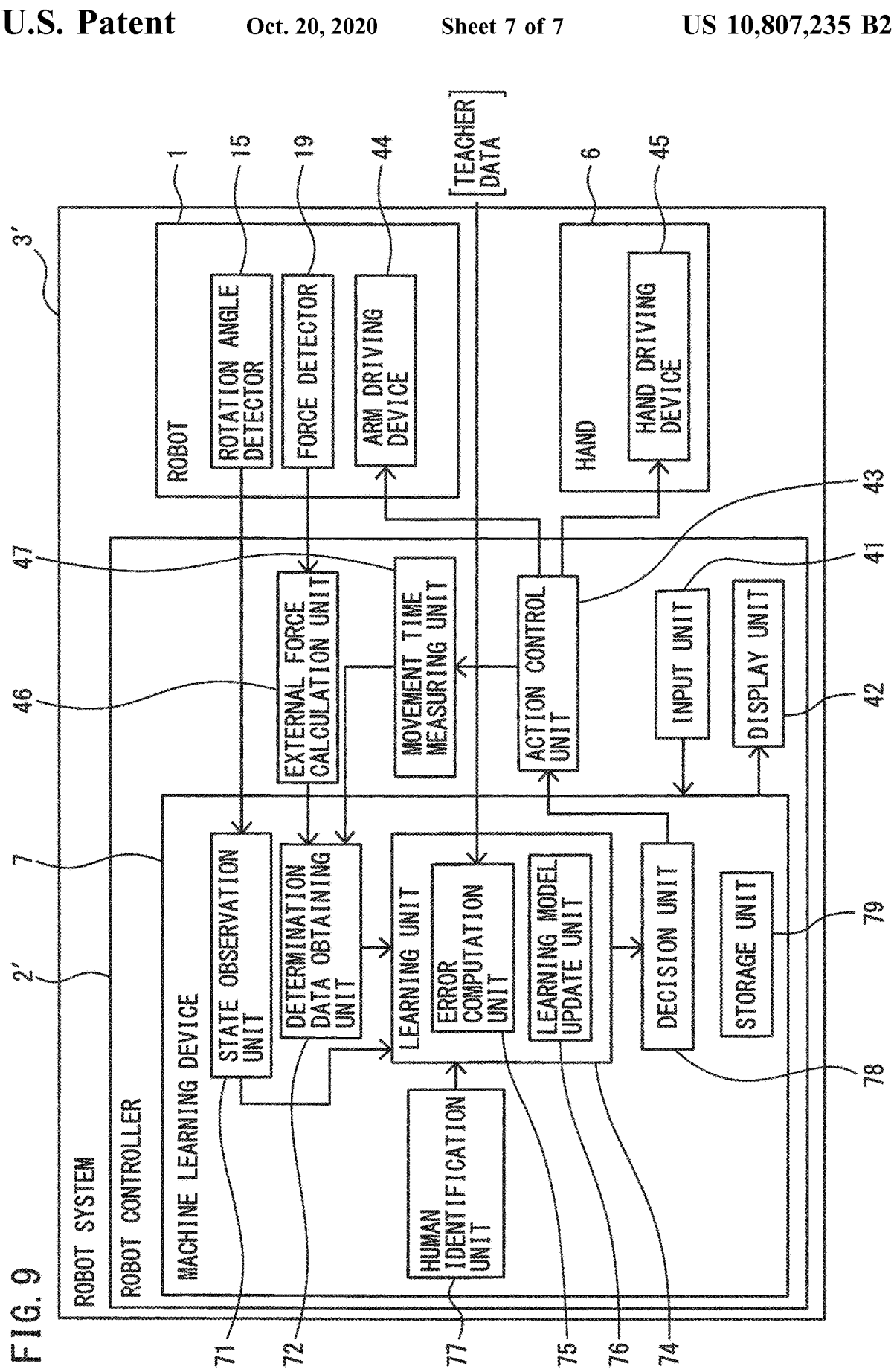
FIG. 9 is a block diagram illustrating a modification of the robot system illustrated as FIG. 2.

FIG. 9 is a block diagram illustrating a modification of the robot system illustrated as FIG. 2 and depicts a robot system 3' which exploits supervised learning. The robot system 3' includes, e.g., a robot 1, a hand 6, and a robot controller 2', as illustrated as FIG. 9. The robot controller 2' includes a machine learning device 7, an input unit 41, a display unit 42, an action control unit 43, an external force calculation unit 46, and a movement time measuring unit 47. The machine learning device 7 includes a state observation unit 71, a determination data obtaining unit 72, a learning unit 74, a human identification unit 77, a decision unit 78, and a storage unit 79. The learning unit 74 includes a reward computation unit 55 and a function update unit 56.

More specifically, as is obvious from a comparison of FIG. 9 with FIG. 2 mentioned earlier, in the learning unit 74 of the robot system 3' in the modification illustrated as FIG. 9, the reward computation unit 55 and the function update unit 56 in the learning unit 54 illustrated as FIG. 2 are replaced with an error computation unit 75 and a learning model update unit 76. Other configurations are substantially the same as the machine learning device 5 illustrated as FIG. 2, and a description thereof will not be given. The error computation unit 75 receives teacher data from the outside and, for example, performs computation to reduce the error with respect to the data obtained by past learning, and the learning model update unit 76 updates the learning model (error model). In other words, the error computation unit 75 receives the output of the state observation unit 71, teacher data, and the like and computes, for example, the error between the result (label)-bearing data and the output of the learning model mounted in the learning unit 74. When, for example, the program input to the robot controller 2' (the operation processed by the robot system 3') is the same, result (label)-bearing data obtained until the day before a predetermined day on which the robot system 3' performs processing can be held and provided to the error computation unit 75 as teacher data on the predetermined day.

Alternatively, data obtained through, e.g., simulation performed outside the robot system 3' or result (label)-bearing data obtained by another robot system may be provided to the error computation unit 75 of the robot system 3' as teacher data via a memory card or a communication line. The result (label)-bearing data may also be held in a non-volatile memory such as a flash memory built into the learning unit 74 and directly used in the learning unit 74.

In the foregoing description, assuming a manufacturing system (manufacturing facility) including a plurality of robot systems 3' (3), for example, a machine learning device 7 (5) may be provided for each robot system 3' (3), and the plurality of machine learning devices 7 (5) located in the plurality of robot systems 3' (3) may share or exchange data with each other via a communication medium. A machine learning device 7 (5) may also be located on, e.g., a cloud server.

The present invention can provide a machine learning device, a robot controller, a robot system, and a machine learning method which may learn the action pattern of a human and set a method for controlling a robot which appropriately assists the human.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for a robot configured to allow a human and the robot to work cooperatively, the machine learning device comprising:
   at least one memory; and
   at least one processor configured to:
      obtain a state variable representing a state of the robot when the human and the robot work cooperatively,
      obtain determination data for a level of burden on the human, wherein the level of burden varies based on an action of the robot,
      set a reward based on the determination data, and
      update a neural network representing a function for setting the action of the robot, based on the state variable and the reward,
   wherein the at least one processor is configured to
      set the reward to become greater for a smaller value of the level of burden, and
      update the neural network to set the action of the robot that leads to a smaller level of burden on the human.

2. The machine learning device according to claim 1, wherein the state variable comprises at least one of a position, an orientation, a velocity, and an acceleration of the robot.

3. The machine learning device according to claim 1, wherein the determination data is calculated based on a force from the human when the human and the robot work cooperatively.

4. The machine learning device according to claim 1, wherein the determination data comprises at least one of a magnitude and a direction of a load sensed by the robot, a magnitude and a direction of a load sensed by an environment surrounding the robot, a level of burden on the environment surrounding the robot, and a time taken to move the robot.

5. The machine learning device according to claim 1, wherein the action of the robot comprises at least one of a position, an orientation, a velocity, and an acceleration of the robot when the robot moves.

6. The machine learning device according to claim 1, wherein the neural network represents the function of predetermined respective positions of the robot when the robot moves.

7. The machine learning device according to claim 1, wherein the at least one processor is further configured to update the neural network based on an identified result of the human.

8. The machine learning device according to claim 1, wherein information obtained by learning in a second robot, which is different from the robot, based on a state variable and a reward for the second robot is shared for the robot and the second robot.

9. The machine learning device according to claim 1, wherein the at least one processor is further configured to set a greater reward for a smaller absolute value of an acceleration of the robot, and a greater reward for a shorter time taken to move the robot.

10. The machine learning device according to claim 1, wherein the at least one processor is further configured to
identify the human who works cooperatively with the robot, and
update the neural network representing the function for setting the action of the robot, based on the identified human.

11. The machine learning device according to claim 1, wherein the robot comprises one of an industrial robot, a field robot, and a service robot.

12. A robot system comprising:
the machine learning device according to claim 1; and
the robot configured to work cooperatively with the human, wherein the at least one processor is further configured to control an action of the robot, and the action of the robot is set based on an output of the neural network.

13. The robot system according to claim 12, wherein the machine learning device is set on a cloud server.

14. The robot system according to claim 12, wherein
the robot comprises:
a first sensor configured to output a signal corresponding to a force from the human; and
a second sensor configured to detect a position and an orientation of the robot, wherein the at least one processor is further configured to
obtain the determination data, based on output of the first sensor, and
obtain the state variable, based on output of the second sensor.

15. The robot system according to claim 14, wherein the second sensor comprises at least one of a motion sensor, a pressure sensor, a torque sensor for a motor, and a contact sensor.

16. A robot system comprising:
a second robot configured to work cooperatively with a second human; and
the neural network updated by the machine learning device according to claim 1, wherein the at least one processor is further configured to
control an action of the second robot, and
obtain a state variable representing a state of the second robot when the second human and the second robot work cooperatively; and
the action of the second robot is set based on an output of the neural network.

17. The machine learning device according to claim 1, wherein
the determination data further includes information for a working efficiency, and
the at least one processor is configured to
set the reward to become greater for a higher value for the working efficiency, and
update the neural network to set the action of the robot that leads to a higher value for the working efficiency.

18. The machine learning device according to claim 1, wherein the level of burden on the human is determined based on at least one of a velocity of the robot and a distance of the robot from the human.

19. A machine learning method, comprising:
obtaining a state variable representing a state of a robot when a human and the robot work cooperatively;
obtaining determination data for a level of burden on the human, wherein the level of burden varies based on an action of the robot;
setting a reward based on the determination data; and
updating a neural network representing a function for setting the action of the robot, based on the state variable and the reward,
wherein the reward becomes greater for a smaller value of the level of burden, and the neural network is updated to set the action of the robot that leads to a smaller level of burden on the human.

20. The method according to claim 19, wherein the state variable comprises at least one of a position, an orientation, a velocity, and an acceleration of the robot.

21. The method according to claim 19, wherein the determination data is calculated based on a force from the human when the human and the robot work cooperatively.

22. The method according to claim 19, wherein the action of the robot comprises at least one of a position, an orientation, a velocity, and an acceleration of the robot when the robot moves.

23. A robot, comprising:
at least one memory; and
at least one processor configured to:
obtain a state variable representing a state of the robot when a human and the robot work cooperatively,
obtain an output from a neural network having the state variable as input information, and
control, based on the output from the neural network, an action of the robot when the human and the robot work cooperatively,
wherein the neural network has been updated, based on a reward for burden on another human, to set the action of the robot that leads to a smaller burden on the human.

* * * * *